(12) United States Patent
Pichlmaier et al.

(10) Patent No.: US 10,886,720 B2
(45) Date of Patent: Jan. 5, 2021

(54) MULTI-CORE CABLE

(71) Applicant: Rosenberger Hochfrequenztechnik GmbH & Co. KG, Fridolfing (DE)

(72) Inventors: Richard Pichlmaier, Fridolfing (DE); Johannes Schmid, Altötting (DE); Thomas Lödding, Traunstein (DE)

(73) Assignee: ROSENBERGER HOCHFREQUENZTECHNIK GMBH & Co. KG, Fridolfing (DE)

( * ) Notice: Subject to any disclaimer, the term of this patent is extended or adjusted under 35 U.S.C. 154(b) by 0 days.

(21) Appl. No.: 16/546,476

(22) Filed: Aug. 21, 2019

(65) Prior Publication Data

US 2020/0076179 A1    Mar. 5, 2020

(30) Foreign Application Priority Data

Aug. 30, 2018   (DE) .................. 10 2018 121 239

(51) Int. Cl.
| H02G 15/02 | (2006.01) |
| H01B 7/18  | (2006.01) |
| H01B 7/00  | (2006.01) |

(52) U.S. Cl.
CPC .......... *H02G 15/02* (2013.01); *H01B 7/1875* (2013.01); *H01B 7/0009* (2013.01)

(58) Field of Classification Search
None
See application file for complete search history.

(56) References Cited

U.S. PATENT DOCUMENTS

| 1,426,210 | A | * | 8/1922 | O'Neil | H02G 3/088 |
| | | | | | 174/59 |
| 1,672,201 | A | * | 6/1928 | Champion | H01R 4/16 |
| | | | | | 439/424 |
| 2,010,530 | A | * | 8/1935 | Atkinson | H02G 15/25 |
| | | | | | 174/22 R |
| 2,106,724 | A | * | 2/1938 | Cope | H01R 4/14 |
| | | | | | 439/783 |
| 2,142,818 | A | * | 1/1939 | Jacobson | H01R 4/185 |
| | | | | | 439/865 |
| 2,456,554 | A | * | 12/1948 | Churchill | H01R 4/184 |
| | | | | | 403/212 |
| 3,168,614 | A | * | 2/1965 | Munn | H02G 15/14 |
| | | | | | 174/70 S |
| 3,221,294 | A | * | 11/1965 | Roberts | H01R 4/185 |
| | | | | | 439/877 |
| 3,262,662 | A | * | 7/1966 | Gastaldi | H02G 3/26 |
| | | | | | 248/68.1 |
| 3,383,457 | A | * | 5/1968 | Schumacher | H01R 43/04 |
| | | | | | 174/261 |

(Continued)

FOREIGN PATENT DOCUMENTS

| DE | 102006044479 A1 | 5/2007 |
| DE | 102017105682 A1 | 9/2018 |
| DE | 102017122048 A1 | 3/2019 |

*Primary Examiner* — Binh B Tran
*Assistant Examiner* — Muhammed Azam
(74) *Attorney, Agent, or Firm* — David P. Dickerson

(57) ABSTRACT

Cable, which can be connected at one end to a connector, having at least two cores, a shield, an insulator, which is formed between the cores and the shield, and having a sleeve, which is formed at the end of the cable, wherein the sleeve comprises a first region with an oblong cross-section and a second region with a round cross-section.

20 Claims, 3 Drawing Sheets

(56) References Cited

U.S. PATENT DOCUMENTS

| | | | | |
|---|---|---|---|---|
| 3,453,376 A * | 7/1969 | Apa | H01R 9/0518 | 174/75 C |
| 3,470,524 A * | 9/1969 | Culver | H01R 13/623 | 439/317 |
| 3,670,293 A * | 6/1972 | Garver | H01R 9/0518 | 439/585 |
| 3,743,748 A * | 7/1973 | Reeder | H01R 9/0515 | 174/75 C |
| 3,793,616 A * | 2/1974 | Moehrke | H01R 24/20 | 439/854 |
| 4,010,538 A * | 3/1977 | O'Keefe | H01R 9/0518 | 29/865 |
| 4,087,889 A * | 5/1978 | Ohba | H01R 4/183 | 16/108 |
| 4,128,735 A * | 12/1978 | Zehren | H02K 5/225 | 174/23 R |
| 4,180,101 A * | 12/1979 | Wegge | F16L 7/00 | 138/103 |
| 4,531,807 A * | 7/1985 | Trigon | H01R 4/184 | 439/866 |
| 4,619,332 A * | 10/1986 | Sheehan | H02G 3/0691 | 174/659 |
| 4,685,758 A * | 8/1987 | Yoshida | H01R 9/05 | 439/606 |
| 4,981,451 A * | 1/1991 | Undin | H01R 4/185 | 29/884 |
| 5,437,567 A * | 8/1995 | Peterson | H01R 13/113 | 439/851 |
| 5,519,170 A * | 5/1996 | Nabeshima | H01R 13/5205 | 174/74 R |
| 5,520,556 A * | 5/1996 | Endo | H01R 13/187 | 439/845 |
| 5,594,202 A * | 1/1997 | Tobias | H02G 3/22 | 174/505 |
| 5,620,347 A * | 4/1997 | Sawada | H01R 13/111 | 439/851 |
| 5,736,678 A * | 4/1998 | Kobayashi | H01R 4/185 | 174/176 |
| 5,741,162 A * | 4/1998 | Kourimsky | H01R 13/432 | 439/746 |
| 5,766,025 A * | 6/1998 | Davis | H01R 13/26 | 439/660 |
| 6,068,526 A * | 5/2000 | Nottrott | H01R 13/11 | 439/845 |
| 6,808,417 B2 * | 10/2004 | Yoshida | H01R 9/0518 | 439/585 |
| 7,273,984 B2 * | 9/2007 | Murphy | H01R 13/5213 | 174/92 |
| 7,318,742 B2 * | 1/2008 | Morikawa | H01R 9/0518 | 174/75 C |
| 7,355,130 B2 * | 4/2008 | Holman | H02G 3/088 | 16/2.1 |
| D595,650 S * | 7/2009 | Di Stefano | D13/133 | |
| D595,651 S * | 7/2009 | Di Stefano | D13/133 | |
| D595,652 S * | 7/2009 | Di Stefano | D13/133 | |
| D595,653 S * | 7/2009 | Di Stefano | D13/133 | |
| 8,397,452 B2 * | 3/2013 | Stahl, Sr. | H02G 3/0418 | 137/79 |
| 8,952,274 B2 * | 2/2015 | Lalancette | H02G 3/22 | 138/110 |
| 9,046,194 B2 * | 6/2015 | Gandolfo | F16L 5/04 | |
| 2005/0287875 A1 * | 12/2005 | Kojima | H01R 4/185 | 439/750 |
| 2007/0053646 A1 * | 3/2007 | Kendricks | G09F 3/00 | 385/136 |
| 2007/0099486 A1 * | 5/2007 | Kameyama | H01R 13/6477 | 439/498 |
| 2007/0178775 A1 * | 8/2007 | Morello | H01R 13/11 | 439/877 |
| 2008/0283268 A1 * | 11/2008 | Iwasaki | H01B 7/285 | 174/78 |
| 2010/0297877 A1 * | 11/2010 | Nakamura | H01R 9/0518 | 439/585 |
| 2012/0164879 A1 * | 6/2012 | Chiu | H01R 24/40 | 439/578 |
| 2013/0319761 A1 * | 12/2013 | Furukawa | H01R 43/048 | 174/74 R |
| 2015/0244085 A1 * | 8/2015 | Miyawaki | H01R 24/44 | 439/578 |
| 2016/0006134 A1 * | 1/2016 | Ohnuma | H01B 1/023 | 439/878 |
| 2016/0035462 A1 * | 2/2016 | Friesinger | H01B 11/1895 | 174/70 R |
| 2016/0093984 A1 | 3/2016 | Iwamoto | | |
| 2016/0099510 A1 * | 4/2016 | Trafton | H01B 7/0036 | 174/74 R |
| 2016/0156127 A1 * | 6/2016 | Nomura | H01R 13/03 | 174/84 R |
| 2016/0218445 A1 * | 7/2016 | Kondou | H01R 4/188 | |
| 2016/0268794 A1 * | 9/2016 | Wakabayashi | H02G 1/14 | |
| 2016/0294097 A1 * | 10/2016 | Uchida | H01R 13/5205 | |
| 2016/0365648 A1 * | 12/2016 | Aoki | H01B 1/026 | |
| 2017/0323706 A1 * | 11/2017 | Brueckner | H01B 7/40 | |
| 2018/0026401 A1 | 1/2018 | Kanda et al. | | |
| 2018/0115115 A1 * | 4/2018 | Nakashima | H01R 4/185 | |
| 2018/0241151 A1 * | 8/2018 | Lane | H01R 13/6272 | |
| 2018/0351305 A1 * | 12/2018 | Maesoba | H01R 13/6581 | |
| 2019/0173243 A1 * | 6/2019 | Annequin | H01B 11/02 | |

\* cited by examiner

MULTI-CORE CABLE

FIELD OF THE INVENTION

The present invention relates to a cable or a connector arrangement with a cable.

SUMMARY OF THE INVENTION

Against this background, the problem which the present disclosure aims to solve is to indicate a cable with improved electrical properties.

The present disclosure teaches a cable, which can be connected at one end to a connector, having at least two conductors/cores, a shield, an insulator, which is formed between the cores and the shield, and having a sleeve, which is formed at the end of the cable, wherein the sleeve comprises a first region with an oblong cross-section and a second region with a substantially round cross-section.

Due to the at least two conductors/cores, which are arranged alongside each other, the shield enclosing the cores bounds off an oblong cross-section. In order to increase the holding force of a sleeve on the shield, the invention proposes adapting the sleeve to the contour or the cross-section of the shield braiding in the region in which the sleeve is to be connected to the shield.

Since the cable with the sleeve is generally connected to an outer conductor having a round cross-section during a further processing step, the invention moreover proposes providing a substantially round cross-section in a second region of the sleeve.

By "oblong" is meant in this application that an extension in a first direction is larger than an extension in a second direction, the second direction being perpendicular to the first direction.

By a substantially round cross-section is meant round cross-sections which may have indentations in the axial direction.

Oblong cross-sections may be substantially in the shape of an oblong hole, for example, that is, short sides are formed by semicircles, while the long sides join the short sides. The term oblong hole does not preclude the long sides from having indentations.

Advantageous embodiments and modifications will emerge from the further dependent claims as well as the description, making reference to the figures of the drawing.

Of course, the features mentioned above and those yet to be explained below can be used not only in the particular indicated combination, but also in other combinations or standing alone, without leaving the scope of the present invention.

In some embodiments in accordance with the present disclosure, the first region is formed at a first end of the sleeve with the connector and the second region is formed at a second end. Accordingly, the invention may be applied to a cable with cores which are arranged next to each other and form an oblong cross-section. Of course, however, the teachings of the present disclosure can also be applied to cables with cores which are arranged in a round cross-section. Thus, accordingly, it may be provided alternatively that the sleeve has a round cross-section at an end with the connector and is oblong in configuration at an oppositely situated end.

In some embodiments in accordance with the present disclosure, the sleeve is formed on the shield, and one end of the shield with the connector is turned back over the sleeve, wherein the turned-over shield extends in particular to behind the sleeve. In this case, better adhesion of the turned-over shield on the sleeve is also ensured.

Owing to the sleeve shape, the shield which is turned back over the supporting sleeve is guided such that air pockets are reduced between the outer conductors and the cable cores, thereby reducing electrical defects. The first region of the sleeve is shaped such that the shield of the conductor is brought into a defined position, especially a contour-following position, with respect to the single cores of the cable and the outer conductor of the connector.

In some embodiments in accordance with the present disclosure, the at least two cores are twisted together. In this case, one also speaks of so-called "twisted pair" cables. The teachings of the present disclosure have especially advantageous effects for "twisted pair" cables, since with conventional oblong sleeves a slight manufacturing tolerance is produced during the assembly of the sleeve on the shield. Problems often occur if a sleeve is twisted slightly relative to the cable during the assembly process. This problem may be alleviated on account of the second region with the round, i.e., rotationally symmetrical cross-section.

In some embodiments in accordance with the present disclosure, the first region comprises two oppositely situated U-shaped brackets. Accordingly, the sleeve may be interrupted in the first region. This has especially advantageous effects for the manufacturability and the production costs of a sleeve. Alternatively, it may be provided that the sleeve with the different cross-sections in the first and second region has an offset between the first and the second region.

It may be provided in this case that the U-shaped brackets are deformed in a processing step, e.g., by crimping, such that they touch or overlap each other.

In some embodiments in accordance with the present disclosure, the sleeve has an indentation following the contour towards the shield. The indentation is accordingly produced on the top or bottom side between two cores. In this way, the electrical properties of the cable are improved in the region of the sleeve.

Of course, the teachings of the present disclosure also applicable to a connector arrangement having a connector and having a cable, as has been described above. In this case, the cable is connected to the connector at an end with the connector in that an outer conductor of the connector arrangement is crimped with the cable.

Of course, however, the teachings of the present disclosure are applicable to all connection options of a cable. Accordingly, one cable may also be connected to another cable or, for example, to a radio module.

In some embodiments in accordance with the present disclosure, it is expedient for the sleeve, the shield and the outer conductor to be crimped together in the first region.

Alternatively or additionally, it is expedient for the sleeve, the outer conductor and in particular the shield to be crimped together in the second region.

Of course, it is especially advantageous to crimp together the sleeve, the shield and the outer conductor both in the first region and in the second region. Thus, the crimping in the first region can be designed advantageously with regard to the holding force of the shield on the sleeve and crimping in the second region can be designed especially advantageously with regard to the outer conductor and sleeve.

The above configurations and modifications may be combined with each other in any meaningful manner. Further possible configurations, modifications and implementations of the invention also encompass not explicitly mentioned combinations of features of the invention mentioned above or described in the following with regard to the exemplary embodiments. In particular, the skilled person will also be able to add individual aspects as improvements or additions to the particular basic form of the present invention.

CONTENTS OF THE DRAWING

The present invention shall be explained more closely in the following with the aid of the exemplary embodiments indicated in the schematic figures of the drawing, in which.

Figure 1:
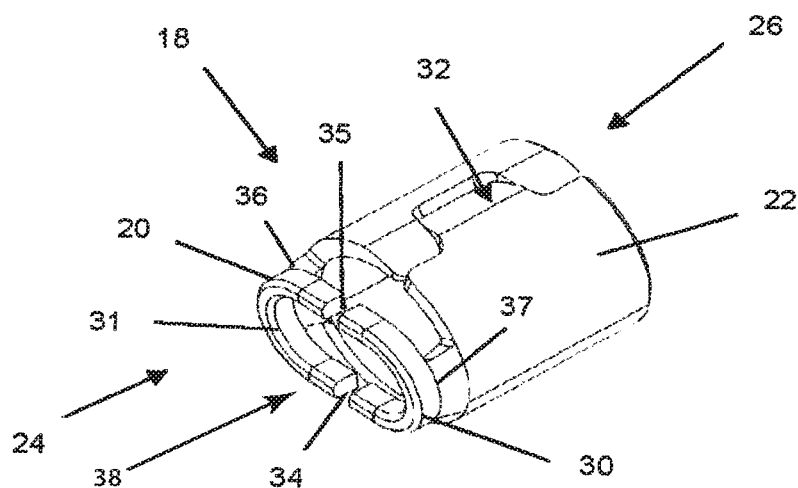
FIG. 1 shows a schematic perspective view of a sleeve for mounting on a cable according to one embodiment in accordance with the present disclosure.

The enclosed figures of the drawing should provide a further understanding of the embodiments of the invention. They illustrate embodiments and serve in combination with the description for explaining principles and concepts of the invention. Other embodiments and many of the mentioned benefits will emerge in view of the drawings. The elements of the drawings are not necessarily shown in true scale to one another.

In the figures of the drawing, the same, functionally equivalent, and identically acting elements, features and components are given the same reference numbers each time—unless otherwise stated.

In the following, the figures shall be described in an interrelated and overlapping manner.

DESCRIPTION OF EXEMPLARY EMBODIMENTS

FIG. 1 shows a sleeve 18 for mounting on a cable 10 according to one embodiment in accordance with the present disclosure. The sleeve 18 comprises a first region 20 with an oblong cross-section. The oblong cross-section is formed roughly as an oblong hole by two oppositely situated U-shaped brackets 30, 31. Between the brackets 30, 31, the sleeve 18 is interrupted by gaps 34, 35, i.e., opposite ends of the brackets 30, 31 do not touch each other in a non-crimped state. The first region may comprise flaps 38. Flaps 38 may constitute the shanks of the U-shaped brackets 30, 31. As such, the sleeve 18 may comprise at least four flaps 38. The sleeve 18 moreover comprises a second region 22 with a substantially round cross-section. Substantially means that the cross-section of the second region 22 is only approximately round and has an indentation 32 at its top side. The indentation 32 is located at a point which is situated between two conductors/cores 12 in the mounted state.

Accordingly, in FIG. 1 the first region 20 with the oblong cross-section is formed at a first end 24 of the sleeve 18 with the connector. The second region 22 of the sleeve 18 is formed at the opposite end 26 of the sleeve with the cable.

The first region 20 of the sleeve 18 is connected to the second region 22 of the sleeve by two cross-pieces 36, 37. In this case, cross-piece 36 connects the U-shaped bracket 31 to the second region 22 of the sleeve, e.g. at a central portion of the U-shaped bracket 31. Cross-piece 37 connects the bracket 30 to the second region 22 of the sleeve.

Figure 2:
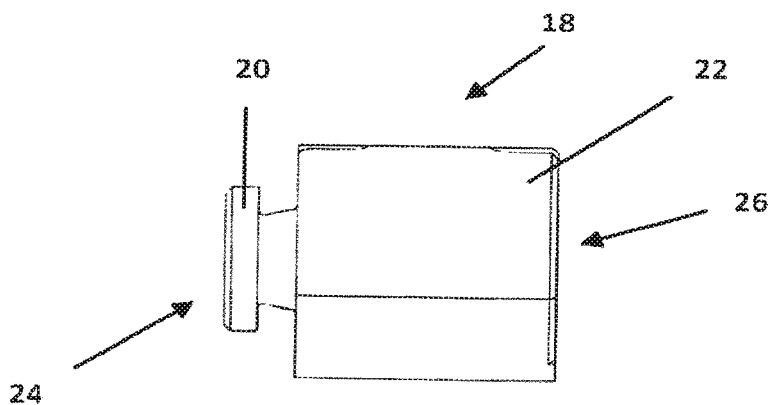
FIG. 2 shows a schematic side view of a sleeve for mounting on a cable according to one embodiment in accordance with the present disclosure.

FIG. 2 shows a sleeve 18 of FIG. 1 in a side view.

Figure 3:
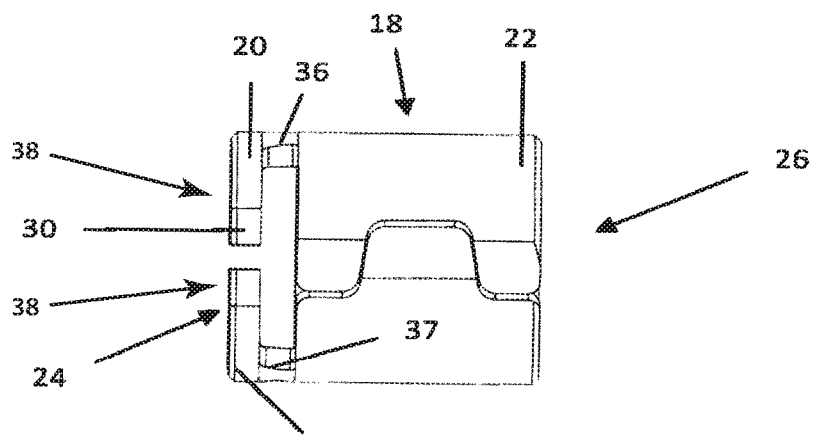
FIG. 3 shows a schematic side view of a sleeve for mounting on a cable according to one embodiment in accordance with the present disclosure.

FIG. 3 shows a sleeve 18 of FIG. 1 and FIG. 2 in a further side view, the sleeve 18 in the side view of FIG. 3 being rotated with respect to the side view of FIG. 2 by 90°.

Figure 4:
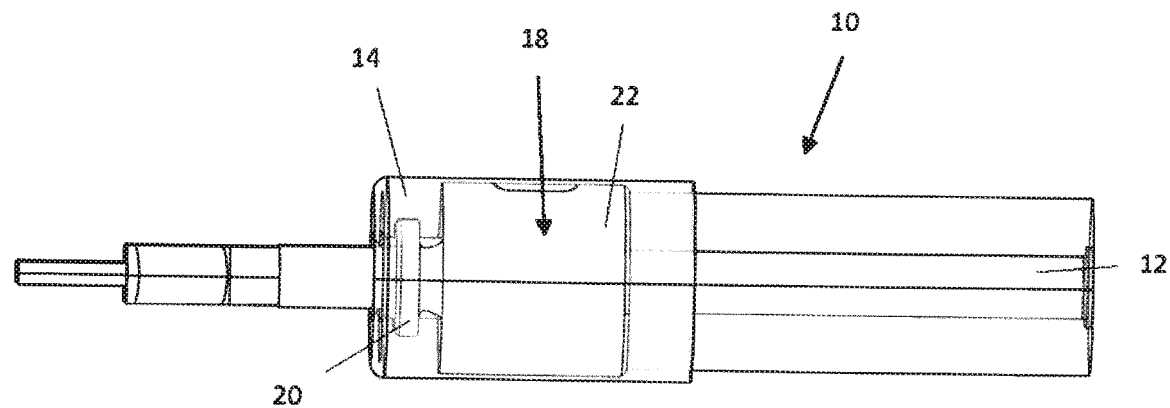
FIG. 4 shows a schematic side view of a cable according to one embodiment in accordance with the present disclosure.

FIG. 4 shows a cable 10 on which a sleeve 18 has been mounted. The cable comprises two cores 12, which are respectively enclosed by an insulator 16 or 17. The insulated cores 12 are enclosed by a common shield 14. The shield 14 forms an outer conductor of the cable, which shields the cores 12 against external electromagnetic influences.

The shield 14 of the cable 10 originally extended between two oppositely situated ends of the cable 10. However, in the course of further processing of the cable 10, the shield 14 has been turned back over the sleeve 18, such that the shield 14 extends from one end of the cable 10 to the end 24 of the sleeve with the connector and is turned back over the sleeve 18 at the end 24 of the sleeve with the connector. Here, the turned-over shield extends to behind the sleeve 18.

Figure 5:
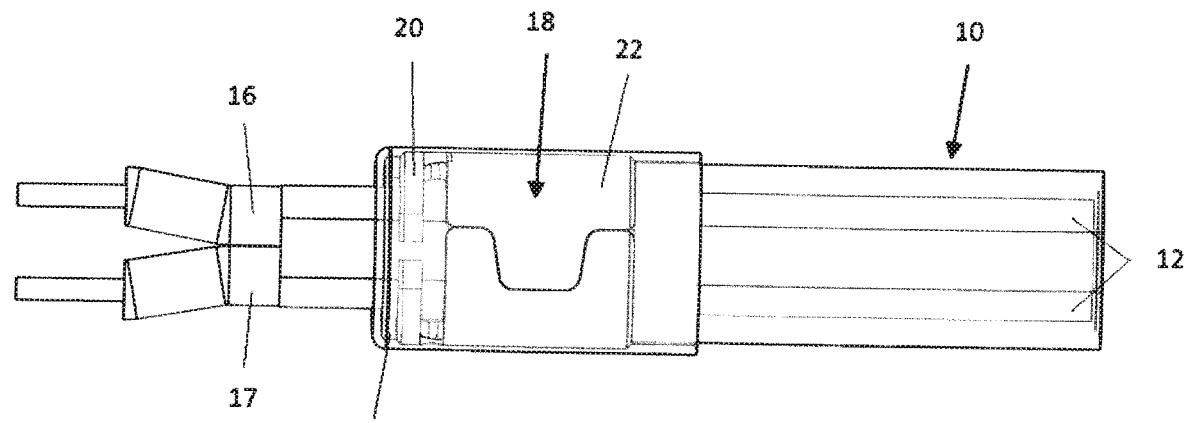
FIG. 5 shows a schematic side view of a cable according to one embodiment in accordance with the present disclosure.

FIG. 5 shows a cable 10 of FIG. 4 in a side view, the side view of FIG. 5 being rotated with respect to the side view of FIG. 4 by 90°.

From a joint viewing of FIGS. 4 and 5 it will be noticed that the shield 14 lies against the cross-section, formed by the two cores 12, between the sleeve 18 and the cores 12. Accordingly, the shield 14 also encloses an oblong cross-section.

Figure 6:
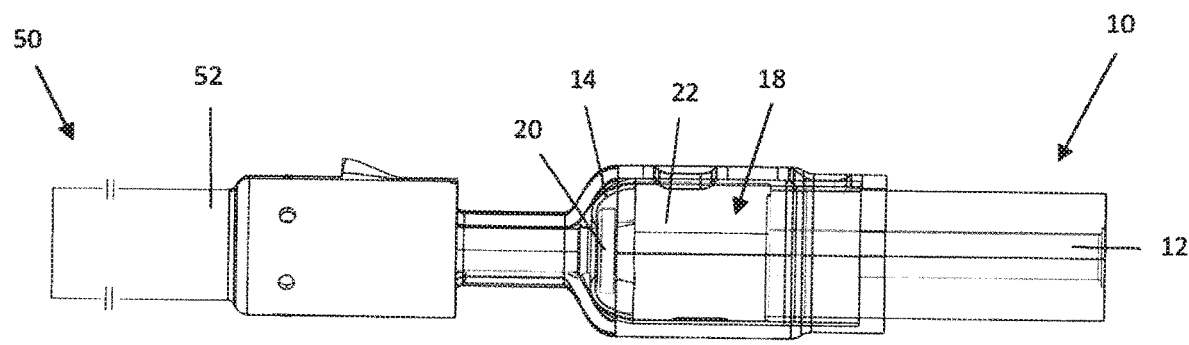
FIG. 6 shows a schematic side view of a connector arrangement according to one embodiment in accordance with the present disclosure.

FIG. 6 shows a connector arrangement 50 having a cable 10 as per FIG. 4 and FIG. 5 in a side view. It can be seen from FIG. 4 and FIG. 6 that the shield 14 or the outer conductor 52 do not lie optimally against the cable in the first region 20 of the sleeve. However, possible negative electrical effects resulting from this can be mitigated or compensated for in that the sleeve 18 lies against the cores 12 in this region.

Figure 7:
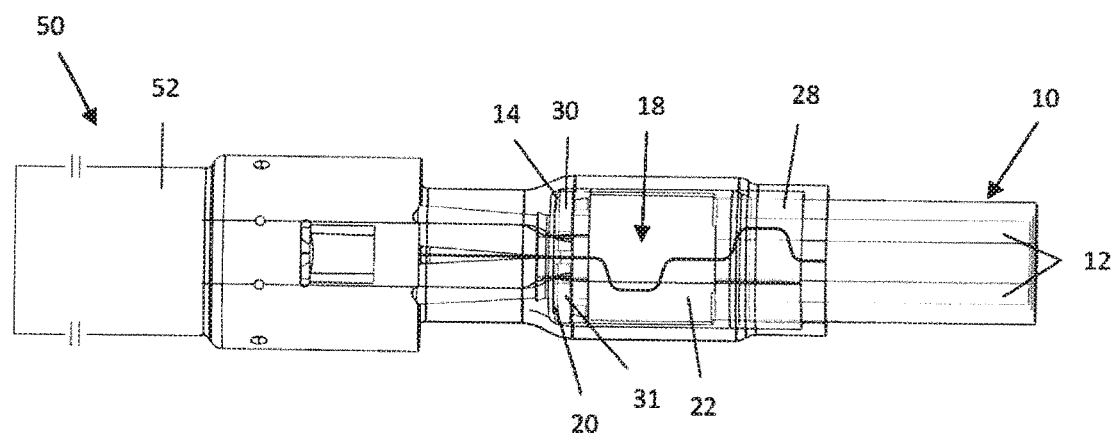
FIG. 7 shows a schematic side view of a connector arrangement according to one embodiment in accordance with the present disclosure.

FIG. 7 shows a connector arrangement 50 of FIG. 6 in a side view, the side view of FIG. 7 being rotated with respect to the side view of FIG. 6 by 90°.

From a joint viewing of FIGS. 4-7 it will be further noticed that the outer conductor 52 or the shield 14 lie against the sleeve 18 in the second region 22.

Although the present invention has been fully described above with the aid of preferred exemplary embodiments, it is not limited to them, but rather can be modified in various ways.

The present disclosure may be summarized as disclosing, inter cilia, the following Embodiments.

Embodiment 1

Cable (10), which can be connected at one end to a connector, having
at least two cores (12),
a shield (14),
at least one insulator (16; 17), which is formed between the cores and the shield, and
having a sleeve (18), which is formed at the end of the cable, wherein the sleeve comprises a first region (20) with an oblong cross-section and a second region (22) with a substantially round cross-section.

Embodiment 2

Cable according to Embodiment 1, wherein the first region is formed at a first end of the sleeve (24) with the connector and the second region is formed at an opposite end of the sleeve (26).

Embodiment 3

Cable according to either of the preceding Embodiments, wherein the sleeve is formed on the shield, and one end of the shield (28) with the connector is turned back over the sleeve, wherein the turned-over shield (28) extends in particular to behind the sleeve.

Embodiment 4

Cable according to one of Embodiments 1-3, wherein the at least two cores are twisted together.

Embodiment 5

Cable according to one of Embodiments 1-4, wherein the first region comprises at least two U-shaped brackets (30, 31), in particular two oppositely situated or four brackets.

Embodiment 6

Cable according to Embodiment 5, wherein the U-shaped brackets make contact or overlap.

Embodiment 7

Cable according to one of Embodiments 1-6, wherein the sleeve, in particular in the second region, has an indentation (32) following the contour towards the shield.

Embodiment 8

Cable according to one of Embodiments 1-7, wherein the sleeve has a gap in the first region, in particular two gaps (34; 35).

Embodiment 9

Cable according to one of Embodiments 1-8, wherein the first region of the sleeve is connected to the second region of the sleeve by means of a cross-piece (36; 37).

Embodiment 10

Connector arrangement (50) having a connector and having a cable according to one of the preceding claims, which is connected to the connector at an end with the connector in that an outer conductor (52) of the connector arrangement is crimped with the cable.

Embodiment 11

Connector arrangement according to Embodiment 10, wherein the sleeve, the shield and the outer conductor are crimped together in the first region.

Embodiment 12

Connector arrangement according to either of Embodiments 10 and 11, wherein the sleeve, the outer conductor and in particular the shield are crimped together in the second region.

LIST OF REFERENCE SYMBOLS

10 Cable
12 Conductors/Cores
14 Shield
16 Insulator
17 Insulator
18 Sleeve
20 First region
22 Second region
24 End of the sleeve with the connector
26 Opposite end of the sleeve
28 Shield
28 U-shaped bracket
30 U-shaped bracket
31 Indentation
32 Gap
35 Gap
36 cross-piece
37 cross-piece
38 flap
50 Connector arrangement
52 Outer conductor

The invention claimed is:

1. A cable, comprising:
a conductive shield;
a first conductor;
a second conductor; and
a sleeve proximate to a first end of said cable, wherein
said first conductor is insulated from said second conductor and said conductive shield,
said second conductor is insulated from said conductive shield,
said sleeve comprises a first bracket and a second bracket,
said sleeve comprises a first, oblong cross-section and a second, substantially round cross-section,
each of said first bracket and said second bracket has a generally U-shaped cross-section in a plane substantially perpendicular to a longitudinal axis of said first conductor,
said first cross-section comprises said generally U-shaped cross-section of said first bracket and said generally U-shaped cross-section of said second bracket, and
said first cross-section is more distal to a second end of said cable than said second cross-section.

2. The cable of claim 1, wherein:
said first conductor extends through a lumen of said conductive shield, and
said second conductor extends through said lumen of said conductive shield.

3. The cable of claim 1, wherein:
said sleeve is situated on an outer circumference of said conductive shield, and
a portion of said conductive shield folds back over an outer circumference of said sleeve.

4. The cable of claim 3, wherein:
said portion of said conductive shield extends over an entire length of said sleeve.

5. The cable of claim 1, wherein:
said first bracket contacts said second bracket.

6. The cable of claim 1, wherein:
said first bracket overlaps said second bracket.

7. The cable of claim 1, wherein:
each of said first bracket and said second bracket comprises a first flap and a second flap.

8. The cable of claim 1, wherein:
said first bracket comprises a first flap and a second flap,
said second bracket comprises a third flap and a fourth flap,
said first flap and said second flap constitute respective shanks of said generally U-shaped cross-section of said first bracket, and
said third flap and said fourth flap constitute respective shanks of said generally U-shaped cross-section of said second bracket.

9. The cable of claim 1, comprising:
a first cross-piece that connects a central region of said first bracket to a portion of said sleeve exhibiting said second, substantially round cross-section, and
a second cross-piece that connects a central region of said second bracket to another portion of said sleeve exhibiting said second, substantially round cross-section.

10. The cable of claim 1, comprising:
four flaps that form a portion of said oblong cross-section.

11. The cable of claim 1, comprising:
at least two cross-pieces that connect said first, oblong cross-section and said second, substantially round cross-section.

12. The cable of claim 8, wherein:
said first flap is substantially aligned with said third flap, and
said second flap is substantially aligned with said fourth flap.

13. The cable of claim 12, wherein:
said first flap is separated from said third flap by a gap, and
said second flap is separated from said fourth flap by a gap.

14. The cable of claim 1, wherein:
said oblong cross-section is a generally oval cross-section.

15. The cable of claim 1, wherein:
each of said oblong cross-section and said substantially round cross-section is a cross-section in a second plane substantially perpendicular to said longitudinal axis of said first conductor.

16. A cable, comprising:
a conductive shield;
a first conductor;
a second conductor; and
a sleeve situated proximate to a first end of said cable, wherein
said first conductor is insulated from said second conductor and said conductive shield,
said second conductor is insulated from said conductive shield,
said sleeve comprises a first bracket and a second bracket,
said sleeve comprises a first, oblong cross-section and a second, substantially round cross-section,
each of said first bracket and said second bracket has a generally U-shaped cross-section in a plane substantially perpendicular to a longitudinal axis of said first conductor, and
said conductive shield comprises a first portion that extends substantially from a second end of said cable to a first end of said sleeve proximate to said second end of said cable, a second portion that extends through said sleeve from said first end of said sleeve to a second end of said sleeve distal to said second end of said cable, a third portion that folds back at said second end of said sleeve, and a fourth portion that extends over an outer circumference of said sleeve, said second portion being intermediate said first portion and said third portion.

17. The cable of claim 16, wherein:
said fourth portion of said conductive shield extends over said outer circumference of said sleeve from said second end of said sleeve to, at least, said first end of said sleeve.

18. The cable of claim 16, wherein:
said first conductor extends through a lumen of said conductive shield, and
said second conductor extends through said lumen of said conductive shield.

19. The cable of claim 16, wherein:
said first bracket and said second bracket collectively form said oblong cross-section.

20. The cable of claim 16, wherein:
said first bracket comprises a first flap and a second flap,
said second bracket comprises a third flap and a fourth flap,
said first flap and said second flap constitute respective shanks of said generally U-shaped cross-section of said first bracket, and
said third flap and said fourth flap constitute respective shanks of said generally U-shaped cross-section of said second bracket.

\* \* \* \* \*